June 9, 1925.
M. BOUZO
IMPLEMENT FOR CUTTING GRASS
Filed March 19, 1923
1,540,925
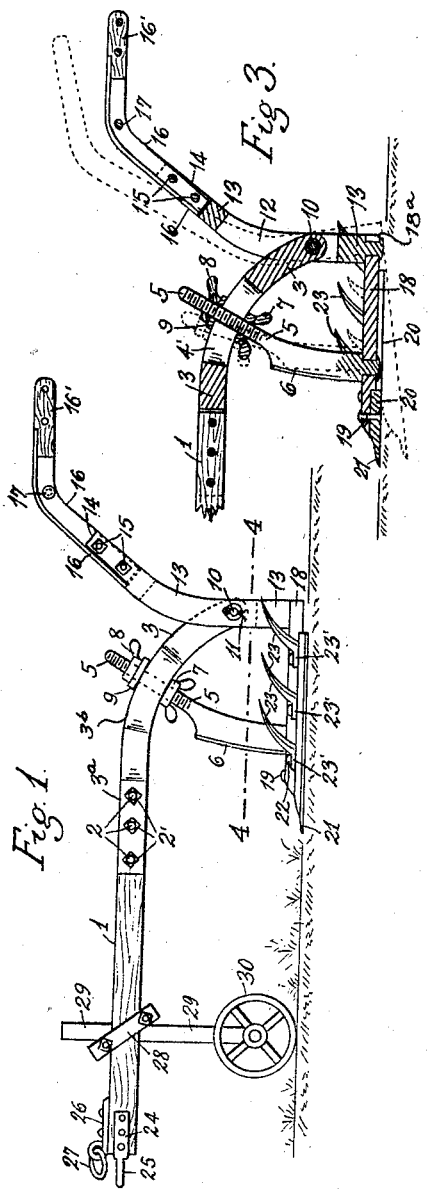
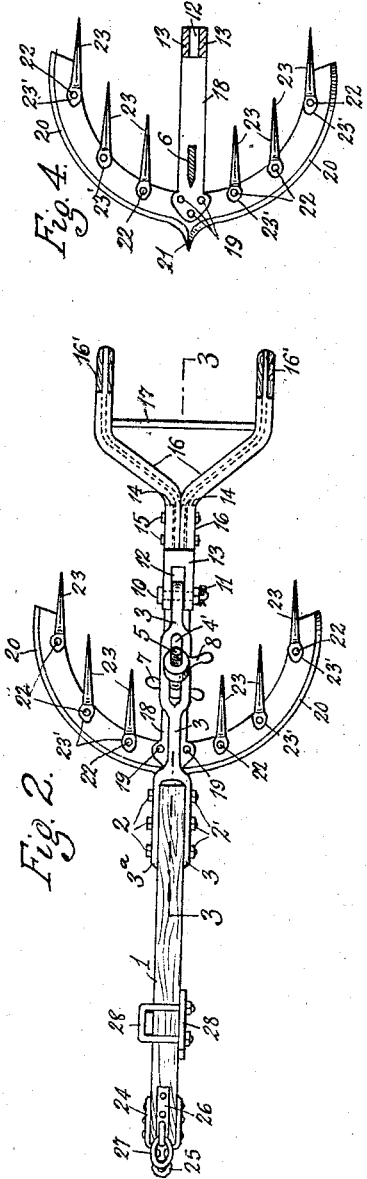
Inventor
Manuel Bouzo,
By B. Singer,
Attorney Patented June 9, 1925.

1,540,925

UNITED STATES PATENT OFFICE.

MANUEL BOUZO, OF HABANA, CUBA.

IMPLEMENT FOR CUTTING GRASS.

Application filed March 19, 1923. Serial No. 626,184.

*To all whom it may concern:*

Be it known that I, MANUEL BOUZO, a citizen of the Republic of Cuba and resident at Habana, Cuba, have invented certain new and useful Improvements in an Implement for Cutting Grass, of which the following is a specification.

This invention is an improved implement especially adapted for use in cutting and destroying grass in the cultivation of field crops, the object of the invention being to provide an improved instrument of this kind which is simple in construction, efficient in use, and by means of which grass and like growth may be destroyed without the employment of hand labor.

One object of the invention is to effect improvements in the construction of the share.

Another object is to effect improvements in the means for adjusting the implement to cause the share to operate at any desired depth in the soil.

Another object is to effect improvements in the construction of the beam, handles and colter.

With the above and other objects in view the invention consists in the construction, combination and arrangement of devices hereinafter described and claimed.

In the accompanying drawings—

Figure 1 is a side elevation of a grass destroying implement constructed and arranged in accordance with my invention.

Figure 2 is a plan of the same.

Figure 3 is a vertical sectional view of the same on the plane indicated by the line 3—3 of Figure 2.

Figure 4 is a horizontal section of the same on the plane indicated by the line 4—4 of Figure 1.

In accordance with my invention the beam 1 has its rear end secured in the fork $3^a$ at the front end of a beam extension 3 which is preferably made of metal and which beam extension is curved downwardly and rearwardly as shown. Bolts 2 and nuts 2' are employed to secure the beam in the fork of the extension. The said extension has an intermediate side portion $3^b$ in which is a vertical longitudinal slot 4'. The lower rear end of the beam extension is arranged in a vertical slot 12 of the standard 13 and connected to said standard by a pivot pin 10 which has at one end a removable pin 11. The upper end of the standard is divided to form handles 16 which are connected together by a bar 17 and are reinforced by angle irons 14 secured by bolts 15. Hand grips 16' are at the rear ends of the handles and are secured also to said angle irons. The lower end of the standard is reduced and secured in a recess $18^a$ in the rear end of a flat arm 18 which extends rearwardly from the center of the flat horizontally arranged substantially semicircular share 20, the front end of said arm being secured to the share as by means of rivets 19. The share is provided with a beveled front cutting edge and is also provided at the center, with a point 21. On the upper side of the share are cutters 23 which curve upwardly and rearwardly therefrom and are each provided with a front cutting edge. Said cutters are secured on the share in suitable spaced relation by rivets 23' or other suitable means.

A colter 6 which is slightly curved upwardly and rearwardly has its lower end secured to the arm 18 at a point immediately in rear of the front portion or central portion of the share and has its front edge beveled on opposite sides to form a cutting edge as indicated in Figures 1, 3 and 4. An upwardly and rearwardly inclined arm 5 extends from the upper end of the colter through the slot 4' and is movable in said slot. Said arm 5 is threaded and is provided with ring nuts 7, 8 and a washer 9, the nut 7 bearing against the lower side of the beam extension 3 and the washer 9 bearing on the upper side thereof.

It will be understood from the foregoing and by reference to the drawings that the standard with its handles and the share can be arranged at any desired angle with respect to the beam to cause the share to operate at any desired depth in the soil, it being only necessary to loosen the nuts 7, 8 and to then effect such adjustment and thereupon to tighten said nuts to secure the parts in the desired adjusted relation.

Near the front end of and under the beam is a soil wheel 30 which is mounted at the lower end of a standard 29, said standard being secured to the beam by a U-bolt 28. A clevis 25 is arranged at the front end of the beam, secured by bolts 24 and a suitable draft plate 26 is similarly secured on the upper side of the beam at the front end and is provided with a draft ring 27 to which a horse or tractor may be attached. In the operation of my invention the implement is drawn through the soil between the rows of plants and is so adjusted and directed by the plowman as to cause the share to operate at the required depth in the soil, to cut the roots of and thereby destroy the grass and other like growth. The share is somewhat inclined when thus adjusted and thereby raises the soil together with the severed grass or other plants as the same pass over the share and the cutters 23 also cut through the soil and the grass or other weeds and assist materially in destroying such growth.

It will be understood that the standard 29 is also vertically adjustable according to the adjustment of the share.

Having thus described my invention, I claim:—

1. In an implement of the class described a beam, a standard pivotally connected to the beam for vertical angular adjustment, a substantially semicircular horizontally arranged share provided at the center with a rearwardly extending arm secured to the lower end of the standard and a colter extending upwardly from said arm and adjustably secured to the beam.

2. In an implement of the class described a beam, a standard pivotally connected to the beam for vertical angular adjustment, a substantially semicircular horizontally arranged share provided at the center with a rearwardly extending arm secured to the lower end of the standard and a colter extending upwardly from said arm and adjustably secured to the beam, said share being provided on its upper side with rearwardly and upwardly extending cutters.

In witness whereof I affix my signature.

MANUEL BOUZO.